United States Patent
Oroskar et al.

(10) Patent No.: US 10,021,686 B1
(45) Date of Patent: Jul. 10, 2018

(54) SCHEDULING TRAFFIC BASED ON ACKNOWLEDGMENT BUNDLING

(71) Applicant: Sprint Spectrum L.P., Overland Park, KS (US)

(72) Inventors: Siddharth S. Oroskar, Overland Park, KS (US); Jasinder P. Singh, Olathe, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 327 days.

(21) Appl. No.: 14/886,554

(22) Filed: Oct. 19, 2015

(51) Int. Cl.
*H04W 72/04* (2009.01)
*H04B 7/14* (2006.01)
*H04L 1/18* (2006.01)
*H04L 5/14* (2006.01)
*H04W 84/04* (2009.01)
*H04W 88/08* (2009.01)

(52) U.S. Cl.
CPC .......... *H04W 72/0446* (2013.01); *H04B 7/14* (2013.01); *H04L 1/1812* (2013.01); *H04L 5/14* (2013.01); *H04W 84/042* (2013.01); *H04W 88/08* (2013.01)

(58) Field of Classification Search
None
See application file for complete search history.

(56) References Cited

U.S. PATENT DOCUMENTS

| 6,308,294 | B1 | 10/2001 | Ghosh et al. |
| 6,631,127 | B1 | 10/2003 | Ahmed et al. |
| 6,697,987 | B2 | 2/2004 | Lee et al. |
| 6,925,132 | B2 | 8/2005 | Song et al. |
| 7,002,993 | B1 | 2/2006 | Mohaban et al. |
| 7,136,929 | B2 | 11/2006 | Koprivica |
| 7,206,280 | B1 | 2/2007 | Khan et al. |

(Continued)

FOREIGN PATENT DOCUMENTS

WO   2007/059523   5/2007

OTHER PUBLICATIONS

IEEE 802.16 Broadband Wireless Access Working Group <http://ieee802.org/16>, Aggregated H-ARQ, Lim Geunhwi, et al., Nov. 4, 2004.

(Continued)

*Primary Examiner* — Edan Orgad
*Assistant Examiner* — Saumit Shah (57) ABSTRACT

A radio access network may determine that a hybrid automatic repeat request (HARQ) transmission schedule of a wireless air interface defined by the RAN includes time-division-multiplexed slots that are subject to HARQ acknowledgment bundling and time-division-multiplexed slots that are not subject to HARQ acknowledgment bundling. The RAN may assign, to relay base stations served by the RAN, time-division-multiplexed slots of the wireless air interface that are not subject to HARQ acknowledgment bundling. The RAN may also assign, to non-relay wireless communication devices (WCDs) served by the RAN, time-division-multiplexed slots of the wireless air interface that are subject to HARQ acknowledgment bundling. The RAN may transmit, over the air interface, HARQ subpackets according to the transmission schedule and assignments of time-division-multiplexed slots.

20 Claims, 8 Drawing Sheets

(56) References Cited

U.S. PATENT DOCUMENTS

| | | | |
|---|---|---|---|
| 7,388,919 B2 | 6/2008 | Varma et al. | |
| 7,447,968 B2 | 11/2008 | Ha et al. | |
| 7,715,347 B2 | 5/2010 | Yoon et al. | |
| 7,978,626 B1 | 7/2011 | Khanka et al. | |
| 8,369,337 B1 | 2/2013 | Singh et al. | |
| 8,634,333 B2 | 1/2014 | Sarkar | |
| 8,958,383 B2 | 2/2015 | Fu et al. | |
| 9,137,814 B2 | 9/2015 | Choi et al. | |
| 9,445,344 B1 | 9/2016 | Oroskar et al. | |
| 9,473,973 B1 | 10/2016 | Oroskar et al. | |
| 9,531,504 B1 | 12/2016 | Shah et al. | |
| 9,531,505 B1 | 12/2016 | Vivanco | |
| 2004/0141525 A1 | 7/2004 | Bhushan et al. | |
| 2004/0179475 A1 | 9/2004 | Hwang et al. | |
| 2006/0013216 A1 | 1/2006 | Rajkotia et al. | |
| 2006/0109810 A1 | 5/2006 | Au et al. | |
| 2007/0070952 A1 | 3/2007 | Yoon et al. | |
| 2007/0091816 A1 | 4/2007 | Lee et al. | |
| 2007/0110095 A1 | 5/2007 | Attar et al. | |
| 2007/0168822 A1 | 7/2007 | Vitebsky et al. | |
| 2007/0214400 A1 | 9/2007 | Smith et al. | |
| 2007/0300120 A1 | 12/2007 | Kim et al. | |
| 2008/0130643 A1 | 6/2008 | Jain et al. | |
| 2008/0168321 A1 | 7/2008 | Lim et al. | |
| 2008/0194284 A1 | 8/2008 | Choi et al. | |
| 2009/0016265 A1 | 1/2009 | Katayama et al. | |
| 2009/0129276 A1 | 5/2009 | Dendy | |
| 2009/0319854 A1 | 12/2009 | Qian et al. | |
| 2009/0327443 A1 | 12/2009 | Pawar et al. | |
| 2010/0091735 A1 | 4/2010 | Kim et al. | |
| 2010/0135156 A1 | 6/2010 | Sakar | |
| 2010/0260126 A1* | 10/2010 | Ulupinar | H04B 7/2606 370/329 |
| 2010/0272048 A1 | 10/2010 | Pan et al. | |
| 2011/0038352 A1 | 2/2011 | Bergman et al. | |
| 2011/0075611 A1 | 3/2011 | Choi | |
| 2011/0149774 A1* | 6/2011 | Chen | H04L 1/1854 370/252 |
| 2011/0280195 A1 | 11/2011 | Muppalla | |
| 2012/0039227 A1 | 2/2012 | Chen et al. | |
| 2012/0087254 A1 | 4/2012 | Yin et al. | |
| 2012/0188947 A1 | 7/2012 | Larsson et al. | |
| 2012/0195252 A1* | 8/2012 | Suga | H04B 7/15528 370/315 |
| 2012/0213192 A1 | 8/2012 | Kiyoshima et al. | |
| 2012/0257588 A1 | 10/2012 | Umeda et al. | |
| 2012/0314679 A1 | 12/2012 | Lee et al. | |
| 2013/0128854 A1 | 5/2013 | Nakashima et al. | |
| 2013/0322358 A1 | 12/2013 | He et al. | |
| 2013/0336199 A1* | 12/2013 | Schwartz | H04B 7/15507 370/315 |
| 2014/0050148 A1* | 2/2014 | Choi | H04L 1/1819 370/328 |
| 2014/0126551 A1 | 5/2014 | Nammi et al. | |
| 2014/0198677 A1 | 7/2014 | Ku et al. | |
| 2014/0301280 A1 | 10/2014 | Che et al. | |
| 2014/0307695 A1 | 10/2014 | Yang et al. | |
| 2015/0223240 A1 | 8/2015 | Choi et al. | |
| 2015/0237644 A1 | 8/2015 | von Elbwart et al. | |
| 2015/0341945 A1 | 11/2015 | Panchal | |

OTHER PUBLICATIONS

"QoS Class Identifier," Wikipedia, https://en.wikipedia.org/wiki/QoS_Class_identifier, accessed Oct. 9, 2015, 3 pages.

3GPP Long Term Evolution (LTE), May 15, 2012, 4 pages, http://4g-lte-world.blogspot.com/2012/05/tti-bundling-in-lte.html?m=1.

LTE Quick Reference, RSPR (References Signal Received Power), ShareTechnote, Jun. 6, 2014, 3 pages, http://www.sharetechnote.com/html/Handbook_LTE_RSRP.html.

LTE Quick Reference, TTI Bundling, ShareTechnote, Jun. 6, 2014, 2 pages, http://www.sharetechnote.com/html/Handbook_LTE_T-TIBundling.html.

Sekhar, Expert Opinion, TTI Bundling in FDD and TD-LTE, Aug. 13, 2012, 4 pages, http://lteuniversity.com/get_trained/expert_opinion1/b/sekhar/archive/2012/08/13/tti-bundling-in-fdd-and-Id-Ite.aspx.

Nannstrom, Jeannette, for 3GPP, "Carrier Aggregation explained," http://www.3gpp.org/technologies/keywords-acronyms/101-carrier-aggregation-explained, Jun. 2013, pp. 1 - 6.

"LTE CA: Carrier Aggregation Tutorial," http://www.radio-electronics.com/info/cellulartelecomms/lte-long-term-evolution/4g-lte-advanced-carrier-channel-aggregation.php, Jul. 15, 2014, pp. 1-9.

Notice of Allowance dated Aug. 23, 2016, issued in connection with U.S. Appl. No. 14/310,909, filed Jun. 20, 2014, 5 pages.

First Action Interview Office Action dated Apr. 26, 2016, issued in connection with U.S. Appl. No. 14/310,909, filed Jun. 20, 2014, 5 pages.

Interview Summary dated Apr. 12, 2016, issued in connection with U.S. Appl. No. 14/310,909, filed Jun. 20, 2014, 3 pages.

First Action Interview Pre-Interview Communication dated Jan. 15, 2016, issued in connection with U.S. Appl. No. 14/310,909, filed Jun. 20, 2014, 4 pages.

Notice of Allowance dated Sep. 22, 2016, issued in connection with U.S. Appl. No. 14/281,412, filed May 19, 2014, 9 pages.

First Action Interview Office Action dated Feb. 10, 2016, issued in connection with U.S. Appl. No. 14/281,412, filed May 19, 2014, 8 pages.

First Action Interview Pre-Interview Communication dated Nov. 19, 2015, issued in connection with U.S. Appl. No. 14/281,412, filed May 19, 2014, 4 pages.

Notice of Allowance dated Aug. 25, 2016, issued in connection with U.S. Appl. No. 14/227,577, filed Mar. 27, 2014, 20 pages.

First Action Interview Office Action dated Jun. 16, 2016, issued in connection with U.S. Appl. No. 14/227,577, filed Mar. 27, 2014, 10 pages.

First Action Interview Pre-Interview Communication dated Apr. 11, 2016, issued in connection with U.S. Appl. No. 14/227,577, filed Mar. 27, 2014, 6 pages.

Notice of Allowance dated May 18, 2016, issued in connection with U.S. Appl. No. 14/337,861, filed Jul. 22, 2014, 10 pages.

Non-Final Office Action dated Jan. 29, 2016, issued in connection with U.S. Appl. No. 14/337,861, filed Jul. 22, 2014, 20 pages.

\* cited by examiner

SCHEDULING TRAFFIC BASED ON ACKNOWLEDGMENT BUNDLING

BACKGROUND

Wireless networks may provide packet-based services to wireless communication devices (WCDs). For example, a radio access network (RAN) may define one or more wireless coverage areas through which the WCDs may obtain wireless communication services from the RAN. A particular WCD may communicate with the RAN via one or more of the RAN's base stations. In order to make this communication more efficient, for example, the RAN may derive one or more subpackets from a full packet to be transmitted to a WCD. The RAN may transmit at least one of these subpackets to the particular WCD. The particular WCD may transmit an acknowledgment (positive or negative) in response to each subpacket that it receives.

OVERVIEW

Communication networks in general, and wireless networks in particular, are subject to impairments that can lead to packet corruption and packet loss. For instance, a wireless signal can suffer from various types of attenuation, reflections, and/or interference. In order to address these problems, and to reduce the effective packet loss rate of a channel, forward error correction (FEC) schemes may be used.

In general, FEC schemes permit a transmitting device, such as a base station, to transmit multiple copies of part or all of a packet to a client node, such as a WCD. Some copies may include FEC coding, for example XOR coding, Reed-Solomon coding, or turbo codes. If a WCD receives a packet with errors, it may be able to apply FEC codes contained within the packet, or contained within packets it has previously received or will subsequently receive, to properly decode the packet. In this way, packet error rates may be reduced.

One method of implementing FEC is through the use of hybrid automatic repeat request (HARQ). Using HARQ, a base station that seeks to transmit a full packet to a WCD instead transmits one or more HARQ subpackets. The HARQ subpackets may be derived from the full packet, and therefore may contain copies of part or all of the full packet. Each HARQ subpacket may also contain an extent of FEC coding. The WCD may transmit a negative acknowledgment (N-ACK) in response to each HARQ subpacket it receives until the WCD can decode the full packet from the series of subpackets. Once the WCD is able to decode the full packet, it may transmit a positive acknowledgment (P-ACK) to the base station.

The use of HARQ over frequency-division duplex (FDD) channels may result in N-ACKs and P-ACKs being transmitted at a relatively fixed time offset after their associated HARQ subpackets are transmitted. However, on time-division duplex (TDD) channels, forward-direction (downlink) traffic is separated from reverse-direction (uplink) traffic by allocation of different respective time slots in a particular frequency band. These time slots may be allocated unequally between the forward and reverse directions in order to accommodate various asymmetric traffic patterns. Thus, in some cases, there may be fewer reverse-direction time slots, in which a WCD can transmit HARQ acknowledgments to a base station, than forward-direction time slots, in which the base station can transmit HARQ subpackets to the WCD.

To accommodate this situation, HARQ acknowledgments may be bundled such that a single HARQ acknowledgment serves to acknowledge more than one HARQ subpacket. For instance, in a possible configuration, a HARQ acknowledgment may acknowledge two consecutive HARQ subpackets. If the HARQ acknowledgment is a P-ACK, then it serves to positively acknowledge both of the two associated HARQ subpackets. However, if the HARQ acknowledgment is an N-ACK, it indicates that one, the other, or both of the two associated HARQ subpackets were not properly received. After such an N-ACK is received, the base station may retransmit the two associated HARQ subpackets, or some variation thereof.

A possible disadvantage to bundled HARQ acknowledgments is that when one HARQ subpacket in a group of HARQ subpackets associated with same HARQ acknowledgment is not properly received, all of the HARQ subpackets in the group may be re-transmitted. This can be wasteful since retransmission of the properly received HARQ subpacket(s) is not necessary.

This disadvantage is particular notable when relay base stations are employed. A relay base station connects wirelessly to a standard base station in the RAN, as if the relay base station were another WCD. However, relay base stations also radiate to define one or more additional wireless coverage areas. By deploying a relatively large number of low-power relay base stations in geographic locations subject to high traffic demands, more WCDs can be supported by the existing infrastructure and gaps in wireless coverage can be closed.

On the other hand, the traffic of WCDs served by a given relay base station is combined on both the forward-direction and reverse-direction links. Thus, when this traffic is subject to HARQ acknowledgment bundling, some subpackets within bundles of two or more subpackets may be unnecessarily retransmitted. This leads to some WCDs served by the given relay base station receiving a poorer service than they otherwise would.

Accordingly, in a first example embodiment, a radio access network may determine that a HARQ transmission schedule of a wireless air interface defined by the RAN includes time-division-multiplexed slots that are subject to HARQ acknowledgment bundling and time-division-multiplexed slots that are not subject to HARQ acknowledgment bundling. The RAN may assign, to relay base stations served by the RAN, time-division-multiplexed slots of the wireless air interface that are not subject to HARQ acknowledgment bundling. The RAN may also assign, to non-relay WCDs served by the RAN, time-division-multiplexed slots of the wireless air interface that are subject to HARQ acknowledgment bundling. The RAN may transmit, over the air interface, HARQ subpackets according to the transmission schedule and assignments of time-division-multiplexed slots.

A second example embodiment may include a non-transitory, computer-readable storage medium, having stored thereon program instructions that, upon execution by a computing device, cause the computing device to perform operations in accordance with the first example embodiment.

A third example embodiment may include a computing device containing at least a processor and data storage. The data storage may include program instructions that, when executed by the processor, cause the computing device to perform operations in accordance with the first example embodiment.

These and other aspects and advantages will become apparent to those of ordinary skill in the art by reading the following detailed description, with reference where appropriate to the accompanying drawings. Further, it should be understood that this overview and other description throughout this document is merely for purposes of example and is not intended to limit the scope of the invention as claimed.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Moreover, throughout this specification and the accompanying drawings, the term "relay base station" will generally refer to base stations that connect wirelessly to standard base stations, as if the relay base station were another WCD. However, relay base stations also radiate to define one or more additional wireless coverage areas, thereby serving WCDs. The term "WCD" will generally refer to a non-relay WCD—that is, a WCD that does not include a relay base station and does not serve as a relay for such a base station.

In order to facilitate understanding of the embodiments herein, the discussions associated with FIGS. 1-4 will focus on wireless networks and HARQ transmission in general, and will not differentiate between relay base stations and non-relay WCDs. Instead, all types of wireless nodes will be referred to as a WCD. Starting with FIG. 5A, relay base stations will be introduced.

1. EXAMPLE WIRELESS COMMUNICATION SYSTEM

Figure 1:
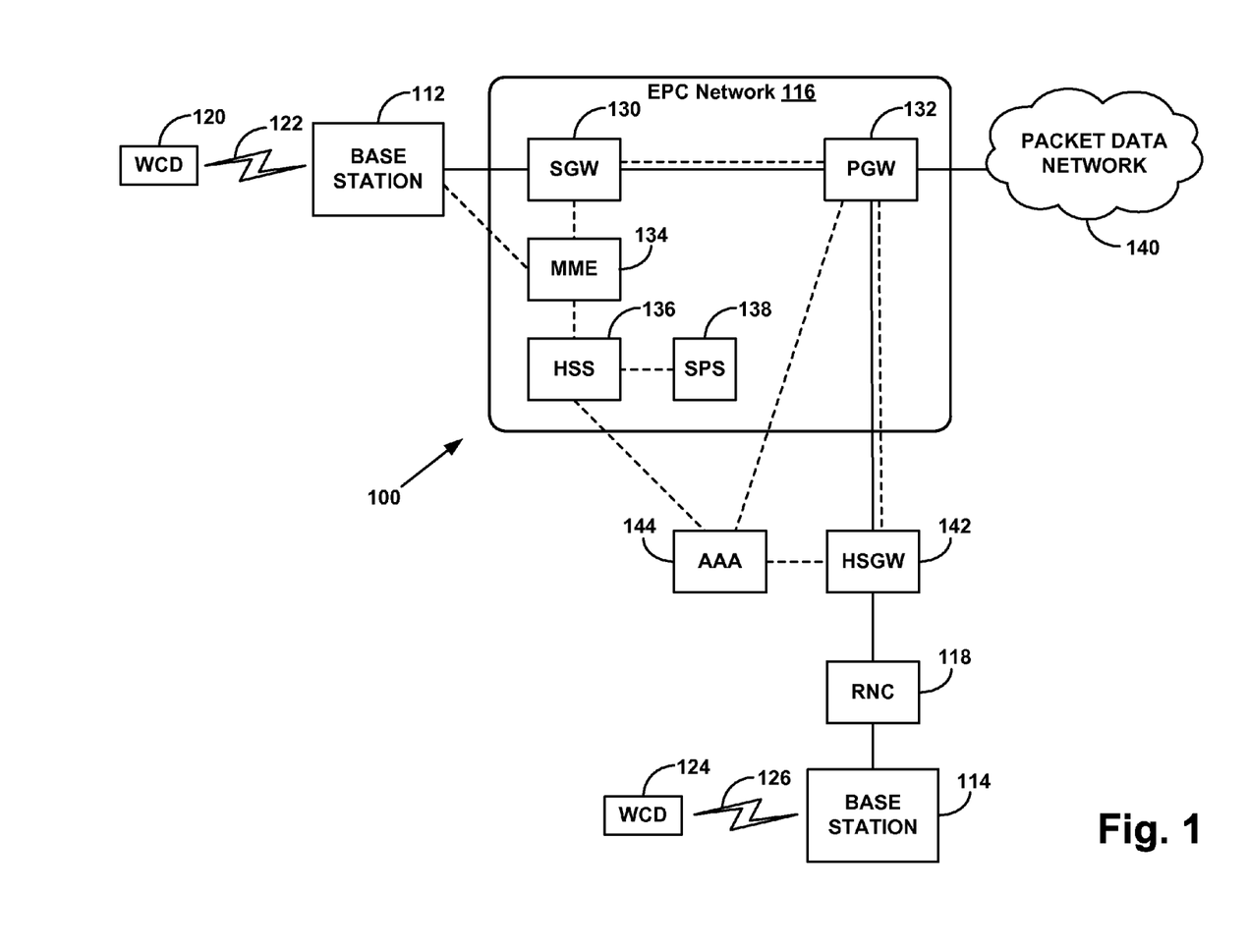
FIG. 1 is a block diagram of a wireless communication system, in accordance with an example embodiment.

FIG. 1 illustrates an example wireless communication system 100, which may be related to aspects of the present disclosure. In this example, wireless communication system 100 includes two different types of base stations, exemplified by base station 112 and base station 114. Base station 112 (e.g., an eNodeB) is part of an evolved RAN that uses an Evolved Packet Core (EPC) network 116. Base station 114 is part of a legacy RAN that includes a radio network controller (RNC) 118. Base stations 112 and 114 each provide one or more respective wireless coverage areas through which the respective base stations can communicate with one or more WCDs. The wireless coverage areas provided by base stations 112 and 114 could be either overlapping or non-overlapping.

A WCD may be referred to as user equipment (UE). Despite this nomenclature, a WCD need not be an end-user device, and may include various types of devices that have limited interactions with human users. For instance, WCDs 120 and 124 could be wireless telephones, wirelessly-equipped handheld, tablet, or laptop computers, or any other type of WCD.

In FIG. 1, connections that carry bearer traffic are indicated by solid lines, connections that carry signaling traffic are indicated by dashed lines, and connections that carry both bearer traffic and signaling traffic are indicated by solid lines in combination with dashed lines. However, both bearer and signaling traffic may be communicated using interfaces and/or paths not explicitly marked as such in FIG. 1.

As shown, base station 112 is in wireless communication with WCD 120 via an air interface 122, and base station 114 is in wireless communication with WCD 124 via an air interface 126. Each of air interfaces 122 and 126 may include forward-direction channels for communication from the RAN to WCDs, and reverse-direction channels for communication from the WCDs to the RAN.

Base stations 112 and 114 may communicate with WCDs using different air interface protocols. In one example, base station 112 communicates with WCDs, such as WCD 120, using a Long Term Evolution (LTE) protocol, whereas base station 114 communicates with WCDs, such as WCD 124, using a High Rate Packet Data (HRPD) protocol, such as Evolution Data-Only (EVDO). These air interface protocols, however, are given merely as illustrative examples. In general, base stations 112 and 114 may communicate using any air interface protocol that is known currently or may be developed.

As shown in FIG. 1, EPC network 116 includes a serving gateway (SGW) 130, a packet gateway (PGW) 132, a mobility management entity (MME) 134, a home subscriber server (HSS) 136, and a subscriber profile store (SPS) 138. PGW 132 may provide connectivity to a packet data network 140. SGW 130 may support the exchange of Internet Protocol (IP) bearer traffic between base station 112 and PGW 132. MME 134 may manage signaling traffic between base station 112 and various elements in EPC network 116, for example, relating to authentication of WCDs and activating and de-activating bearer connections for WCDs. HSS 136 may be configured to authenticate WCDs, as well as access subscriber profiles stored in SPS 138. For example, SPS 38 may store subscriber profiles for WCDs that are authorized to use EPC network 116.

With this configuration, EPC network 116 can provide packet data connections to packet data network 140 for WCDs served by base stations in an evolved RAN, for example, WCD 120 served by base station 112. The packet data connections that EPC network 116 provides to WCDs may, in turn, be used for web access, email, text, voice-over-IP (VOIP), video, streaming media, gaming, and/or other packet data services.

In addition, EPC network 116 may provide packet data connections to packet data network 140 for WCDs served by other RANs, such as WCDs served by legacy RANs. In the example shown in FIG. 1, wireless communication system 100 includes an HRPD serving gateway (HSGW) 142 that supports interworking between EPC network 116 and a legacy RAN, the latter exemplified in FIG. 1 by base station 114 and RNC 118. This interworking may involve (i) HSGW 142 communicating with an authentication, authorization, and accounting (AAA) server 144, which, in turn, may communicate with HSS 136, and (ii) HSGW 142 communicating with PGW 132.

For example, WCD 124, when served by base station 114, may transmit a data-connection request that relates to establishing a packet data connection. HSGW 142 may receive the data-connection request via base station 114 and RNC 118, and, in response, communicate with AAA 144 to authenticate WCD 124. As part of the authentication process, AAA 144 may perform various functions, such as communicating with HSS 136, issuing an authentication challenge to WCD 124, evaluating a response from WCD 124 to the authentication challenge, and indicating to HSGW 142 whether the authentication process is successful or unsuccessful. If the authentication process is successful, HSGW 142 may communicate with PGW 132 to request a packet data connection to packet data network 140 for WCD 124. In response to the request from HSGW 142, PGW 132 may communicate with AAA 144 to authenticate WCD 124 in another authentication process. If that authentication process is successful, PGW 132 may establish the packet data connection, which then enables WCD 124 to communicate with packet data network 140 via air interface 126, base station 114, RNC 118, HSGW 142, and PGW 132.

In general, the depictions of FIG. 1 are illustrative. Therefore, in a RAN, there could be more or fewer of each element than is shown, and some elements may be omitted altogether. Additionally, other types of elements not shown may be present. Further, any of these elements may be combined with one another, physically or logically, or distributed across multiple physical devices. Thus, the particular arrangement shown in FIG. 1 should not be viewed as limiting.

The arrangement of wireless communication system 100 and the processes described herein are set forth herein for purposes of example only. Other arrangements and elements (e.g., machines, interfaces, functions, orders of elements, etc.) can be added or used instead, and some elements may be omitted altogether. Further, those skilled in the art will appreciate that many of the elements described herein are functional entities that may be implemented as discrete components or in conjunction with other components, in any suitable combination and location, and that various disclosed functions can be implemented by any combination of hardware, firmware, and/or software, such as by one or more processors programmed to execute computer instructions for instance.

2. EXAMPLE COMPUTING DEVICE

Figure 2:
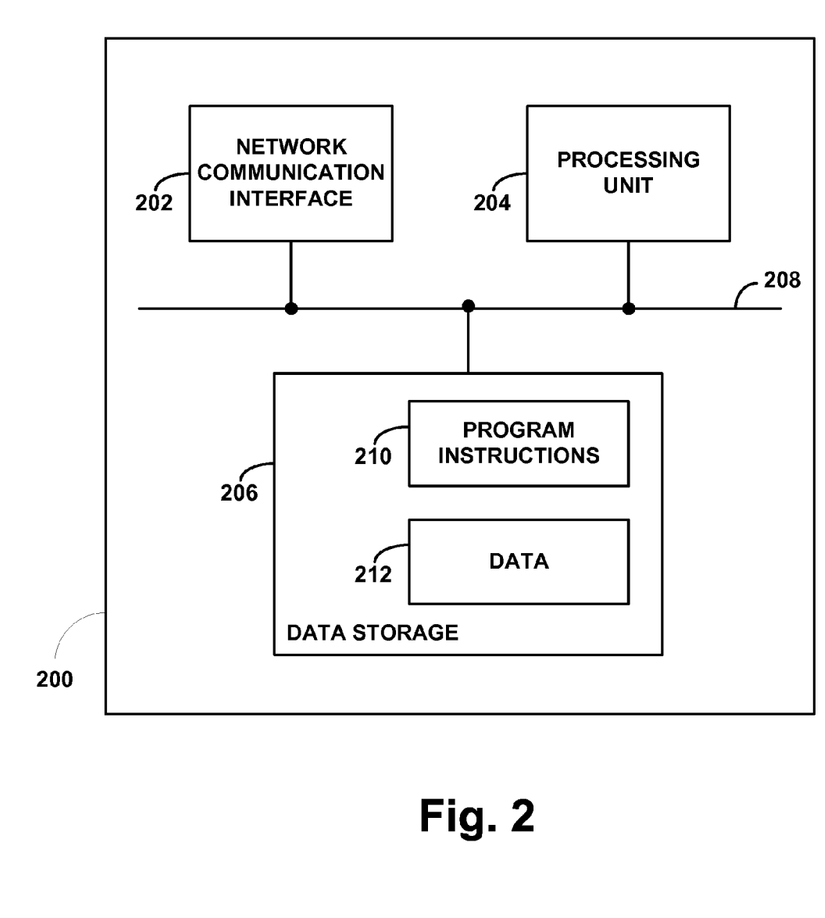
FIG. 2 is a block diagram of a computing device, in accordance with an example embodiment.

FIG. 2 is a block diagram of an example computing device 200. Computing device 200 could be a standalone general purpose or specialized computing device. Alternatively, computing device 200 could be a WCD or a part of the RAN. Thus, computing device 200 may represent a base station, MME, SGW, PGW, or some other type of RAN component or computer.

As shown, computing device 200 includes a network communication interface 202, a processing unit 204, and data storage 206, all of which may be communicatively linked together by a system bus, network, or other connection mechanism 208. Computing device 200 may also include additional components, functions and/or interfaces not shown in FIG. 2, such as a keyboard, a mouse, a touch screen, a monitor, a printer, and/or one or more ports that interface with such devices, for example a universal serial bus (USB) or high-definition multimedia interface (HDMI) port.

Network communication interface 202 may support communication with various other network entities, such as any of the network entities shown in FIG. 1. As such, interface 202 may include one or more network interface modules, such as Ethernet, Wifi, BLUETOOTH®, and/or wide-area wireless connection network interface modules, or any other type of wired and/or wireless communication interfaces.

Processing unit 204 may comprise one or more general purpose processors (e.g., microprocessors) and/or one or more special purpose processors (e.g., application specific integrated circuits, digital signal processors, and/or network processors). Data storage 206 may comprise one or more volatile and/or non-volatile non-transitory storage components, such as optical, magnetic, or flash storage, and may be integrated in whole or in part with processing unit 204.

As shown, data storage 206 may hold program instructions 210 and data 212. Program instructions 210 may be executable by processing unit 204 to carry out various functions described herein and/or depicted in the accompanying drawings. Data 212 could be any data that is generated, received, stored, or used in connection with carrying out such functions.

3. EXAMPLE HARQ COMMUNICATION

For purposes of illustration, this section describes examples of HARQ transmissions between base station 112 and WCD 120. In these examples, base station 112 transmits HARQ subpackets (possibly containing payload and/or FEC bits) to WCD 120 on a forward-direction channel, and WCD 120 transmits HARQ acknowledgments to base station 112 on a reverse-direction channel.

Nonetheless, the procedures described herein may be carried out in other ways. For instance, the HARQ transmissions may take place between other types of devices, such as base station 114 and WCD 124. Alternatively, or additionally, the HARQ subpackets may be transmitted on a reverse-direction channel and the HARQ acknowledgments may be transmitted on a forward-direction channel.

Figure 3:
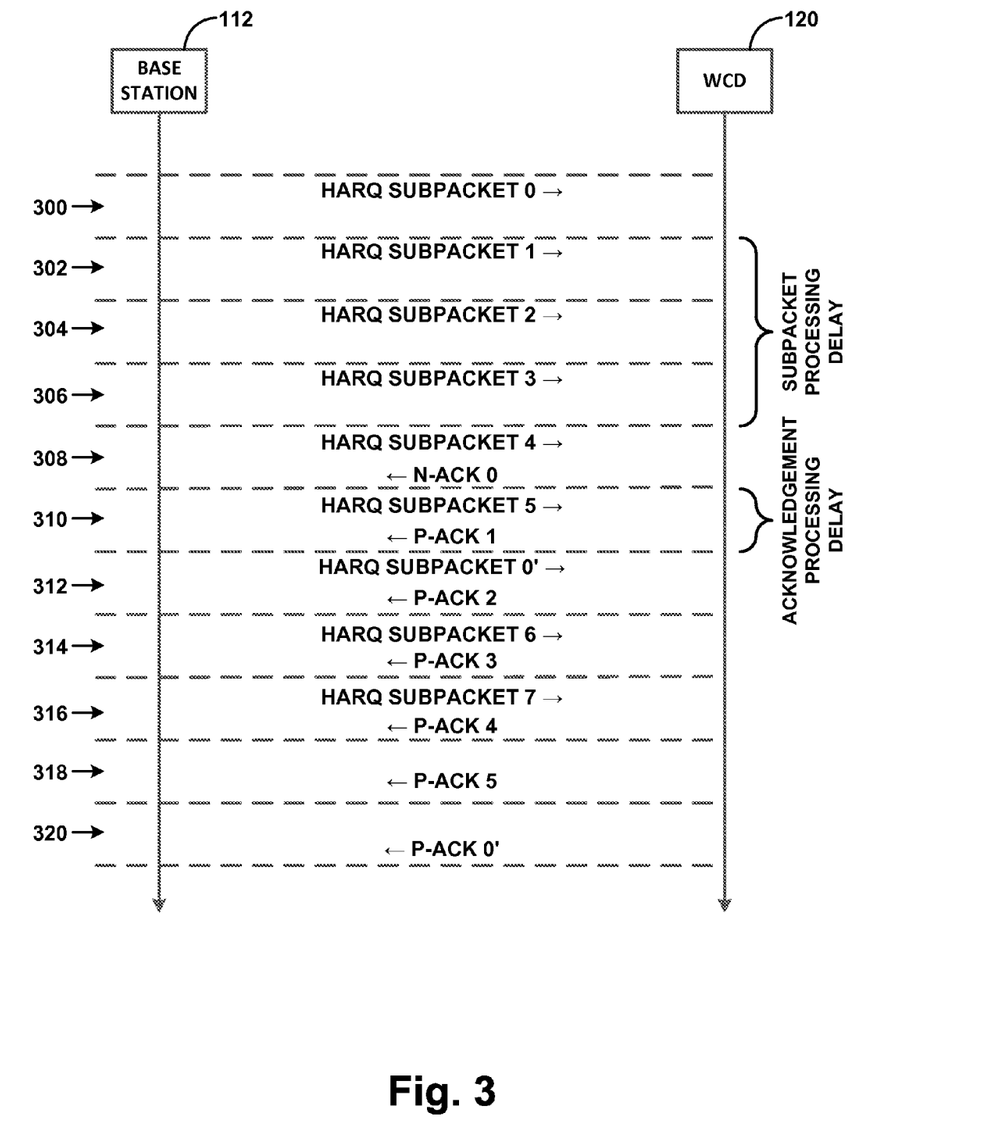
FIG. 3 illustrates unbundled HARQ transmissions, in accordance with an example embodiment.

FIG. 3 illustrates a series of HARQ transmissions between base station 112 and WCD 120 in an FDD system. Thus, in each of time slots 300-320, either or both base station 112 and WCD 120 may transmit to one another, perhaps simultaneously, on different frequencies. For purposes of simplicity, it is assumed that base station 112 has eight HARQ subpackets queued to transmit to WCD 120.

Starting in time slot 300, base station 112 begins transmitting the HARQ subpackets to WCD 120. In time slot 300, base station 112 transmits HARQ subpacket 0. In time slot 302, base station 112 transmits HARQ subpacket 1. In time slot 304, base station 112 transmits HARQ subpacket 2. In time slot 306, base station 112 transmits HARQ subpacket 3.

As an example, it is assumed that WCD 120 uses three full time slots to process each HARQ subpacket. Thus, the first opportunity that WCD 120 has to transmit a HARQ acknowledgment to base station 112 is time slot 308. In this time slot, WCD 120 N-ACKs HARQ subpacket 0, indicating that WCD 120 was unable to properly process or decode this subpacket. It is also assumed, for example, that base station 112 uses one full time slot to process each HARQ acknowledgment. Therefore, the earliest time slot in which base station 112 can respond to the N-ACK is time slot 312.

In time slot 312, base station 112 transmits HARQ subpacket 0', which may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. WCD 120 also transmits a P-ACK for HARQ subpacket 2 in this time slot.

In the interim, base station 112 transmits HARQ subpacket 4 to WCD 120 in time slot 308. Additionally, base station 112 transmits HARQ subpacket 5 to WCD 120 in time slot 310, and WCD 120 transmits a P-ACK of HARQ subpacket 1 also in time slot 310.

In time slots 314 and 316, base station 112 transmits HARQ subpackets 6 and 7, respectively, and WCD 120 transmits P-ACKs to HARQ subpackets 3 and 4, respectively. In time slots 318 and 320, base station 112 does not transmit HARQ subpackets because it has transmitted all eight that it had queued for transmission. However, should any further N-ACKs be received from WCD 120, base station 112 may retransmit the associated HARQ subpackets. Nonetheless, in time slots 318 and 320, WCD 120 transmits P-ACKs to HARQ subpackets 5 and 0', respectively.

The latter P-ACK indicates that WCD 120 properly processed and decoded HARQ subpacket 0'. For instance, this P-ACK may indicate that WCD 120 successfully combined the information that it received in HARQ subpacket 0 and HARQ subpacket 0' during time slots 300 and 312. This P-ACK may also indicate that WCD 120 was able to properly process and decode the full packet from which these subpackets were derived.

FIG. 3 depicts just one possible HARQ transmission scenario. Other scenarios may exist. In some of these scenarios, there may be more or fewer N-ACKs, and the general pattern of HARQ subpacket transmission and associated HARQ acknowledgments may vary. Thus, FIG. 3 should be considered illustrative and non-limiting.

Figure 4:
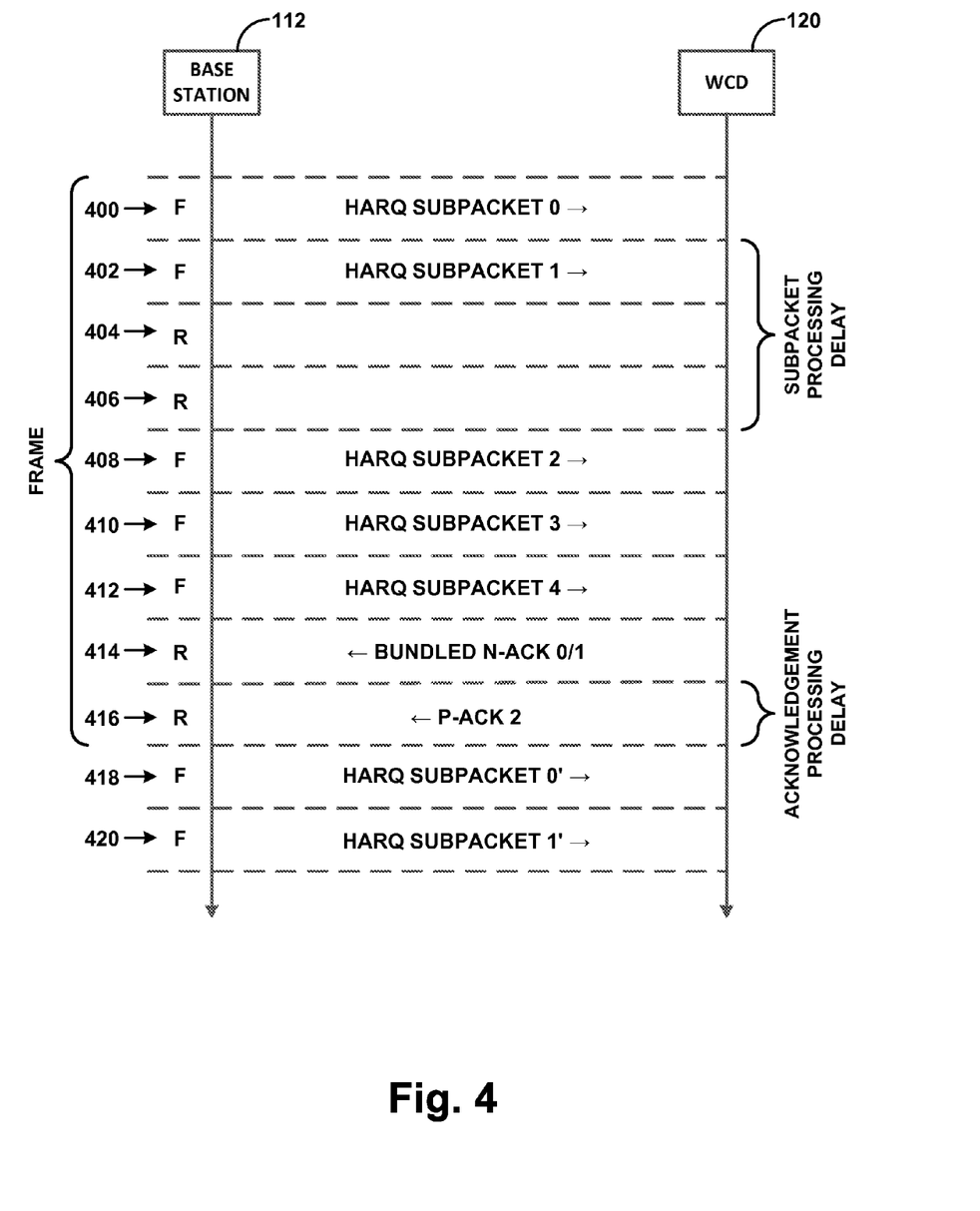
FIG. 4 illustrates bundled HARQ transmissions, in accordance with an example embodiment.

FIG. 4 illustrates a series of HARQ transmissions between base station 112 and WCD 120 in a TDD system. In a TDD system, each time slot may be used for either forward-direction transmission or reverse-direction transmission. Thus, in each of time slots 400-420, either base station 112 or WCD 120, but not both, may transmit.

In such a TDD system, the number of time slots per frame (where a frame is a repeating sequence of consecutive time slots) may be asymmetric. For instance, to accommodate client/server traffic in which client devices tend to receive more bearer data than they transmit, more TDD slots may be dedicated to supporting forward-direction traffic than reverse-direction traffic. As just one example, FIG. 4 depicts eleven time slots, seven of which are forward-direction (indicated by an "F"), and four of which are reverse-direction (indicated by an "R"). Of these, slots 400-416 belong to a particular frame, and slots 418 and 420 belong to a subsequent frame that repeats the pattern of the particular frame.

Due to such asymmetry, there may be more opportunities for HARQ transmission than HARQ acknowledgment transmission in a given frame. Thus, it may be beneficial to bundle HARQ acknowledgments. When HARQ acknowledgments are bundled, a single HARQ acknowledgment may serve to acknowledge more than one HARQ subpacket. As a possible result, more HARQ transmissions can be supported with fewer time slots.

For instance, in a possible configuration that is depicted in FIG. 4, each HARQ acknowledgment may acknowledge up to two consecutive HARQ subpackets. If the HARQ acknowledgment is a P-ACK, then it serves to positively acknowledge the associated HARQ subpackets. However, if the HARQ acknowledgment is an N-ACK for two HARQ subpackets, it indicates that one, the other, or both of these HARQ subpackets were not properly received. After such an N-ACK is received, the base station may retransmit the two associated HARQ subpackets, or some variation of these HARQ subpackets.

In FIG. 4, base station 112 transmits HARQ subpackets 0 and 1 in forward-direction time slots 400 and 402, respectively. As was the case for FIG. 3, it is assumed that WCD 120 uses three full time slots to process each HARQ subpacket and that base station 112 uses one full time slot to process each HARQ acknowledgment. Thus, in reverse-direction time slots 404 and 406, WCD 120 is not yet able to acknowledge HARQ subpackets 0 or 1.

In forward-direction time slots 408, 410, and 412, base station 112 transmits HARQ subpackets 2, 3, and 4, respectively. In reverse-direction time slot 414, WCD 120 has its first opportunity to acknowledge HARQ subpackets 0 and 1. WCD 120 transmits a bundled N-ACK for HARQ subpackets 0 and 1 in this time slot. This indicates that WCD 120 was unable to properly process or decode either HARQ subpacket 0, HARQ subpacket 1, or both.

On the other hand, in reverse-direction time slot 416, WCD 120 transmits a P-ACK for HARQ subpacket 2, indicating that WCD 120 was able to properly process and decode HARQ subpacket 2. Regardless, in forward-direction time slots 418 and 420, base station 112 transmits HARQ subpackets 0' and 1', respectively.

HARQ subpacket 0' may be identical to HARQ subpacket 0. Alternatively, HARQ subpacket 0' may be different from HARQ subpacket 0', but derived from the same full packet as HARQ subpacket 0. For instance, HARQ subpacket 0 and HARQ subpacket 0' may have similar or the same payload bits, but different FEC bits. Similarly, HARQ subpacket 1' may be identical to HARQ subpacket 1. Alternatively, HARQ subpacket 1' may be different from HARQ subpacket 1', but derived from the same full packet as HARQ subpacket 1. Likewise, HARQ subpacket 1 and HARQ subpacket 1' may have similar or the same payload bits, but different FEC bits.

The RAN may be aware of which slots in a frame are subject to bundled HARQ acknowledgments due to the frame's configuration. For instance, in FIG. 4, the pattern of slots 400-416 may repeat in each frame (i.e., slots 400-416 are one full frame and slots 418 and 420 are the first two slots of the next frame). Thus, the RAN may be able to conclude that HARQ acknowledgments for slots 400 and 402 will be bundled, that the HARQ acknowledgments for slot 408 will not be bundled, that HARQ acknowledgments for slots 410 and 412 will be bundled, and so on. The configuration of frames between the RAN and a particular WCD may be pre-established or negotiated by these devices.

4. EXAMPLE RELAY BASE STATION DEPLOYMENT, ARCHITECTURE AND USE

Figure 5A:
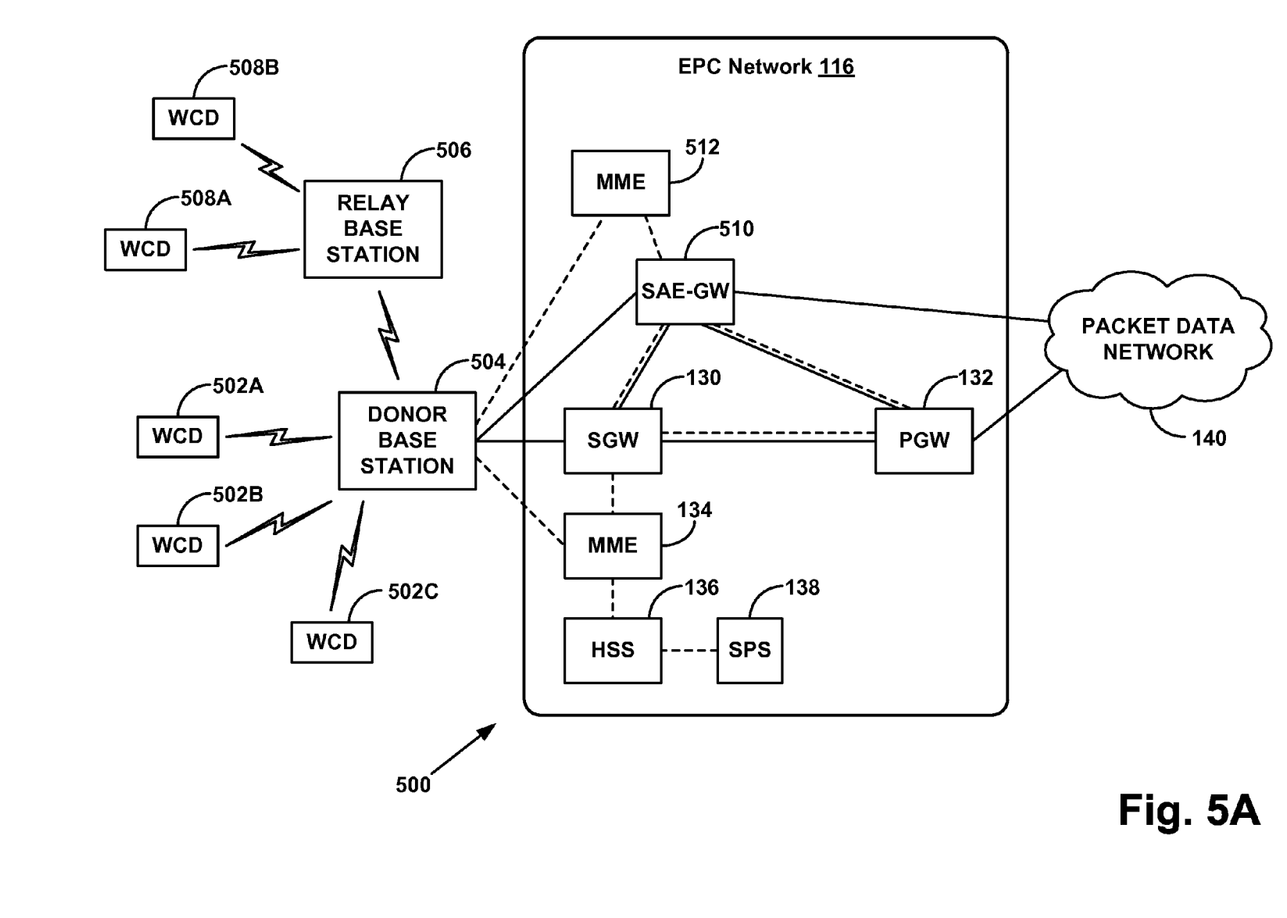
FIG. 5A is a block diagram of a wireless communication system with a relay base station, in accordance with an example embodiment.

FIG. 5A depicts a wireless communication system 500 with a relay base station. Otherwise, FIG. 5A is similar to FIG. 1, but focuses on EPC Network 116. Donor base station 504 serves WCDs 502A, 502B, and 502C, as well as relay base station 506. Donor base station 504 is referred to as a "donor" because it serves a relay base station, but may otherwise be operationally similar to base station 112 in FIG. 1. Relay base station 506 communicates wirelessly with donor base station 504, and radiates to define at least one wireless coverage area with which relay base station 506 serves WCD 508A and WCD 508B. Therefore, traffic to and from WCD 508A and WCD 508B traverses both relay base station 506 and donor base station 504. Further, donor base station 504 may transmit multiplexed traffic to WCD 508A and WCD 508B in forward-direction slots assigned to RBS 506, and may receive multiplexed traffic from WCD 508A and WCD 508B in reverse-direction slots. Thus, between relay base station 506 and donor base station 504, traffic from two or more WCDs served by relay base station 506 may be combined in some fashion.

Additional elements may be added to EPC network 116 to support relay base stations. For instance, MME 512 may be used to assign a gateway, such as system architecture evolution gateway (SAE-GW 510), to anchor traffic to and from relay base stations. MME 512 may also participate in the authentication of relay base stations, as well as activation and de-activation of bearer connections for relay base stations. SAE-GW 510 may provide the functionality of both an SGW and a PGW for relay base stations. On the other hand, the functionality of either of MME 512 or SAE-GW 510 may be incorporated to MME 134 or SGW 130/PGW 132, respectively.

As discussed above, a possible disadvantage to bundled HARQ acknowledgments is that when just one HARQ subpacket in a group of HARQ subpackets associated with same HARQ acknowledgment is not properly received, all of the HARQ subpackets in the group may be re-transmitted. This can be wasteful since retransmission of the properly received HARQ subpackets is not necessary.

The traffic of WCDs served by relay base station 506 may be combined, by way of bundled HARQ acknowledgments, between relay base station 504 and donor base station 504. Thus, some subpackets within bundles of two or more subpackets may be unnecessarily retransmitted. This leads to some WCDs served by the relay base station 506 receiving a poorer service than they otherwise would. In order to mitigate this disadvantage, the RAN may assign traffic to and from relay base stations to slots that are not subject to HARQ acknowledgment bundling. Thus, the number of HARQ subpacket retransmissions due to bundled HARQ acknowledgments may be reduced. Various manners in which these slot assignments can be made are introduced below.

Figure 5B:
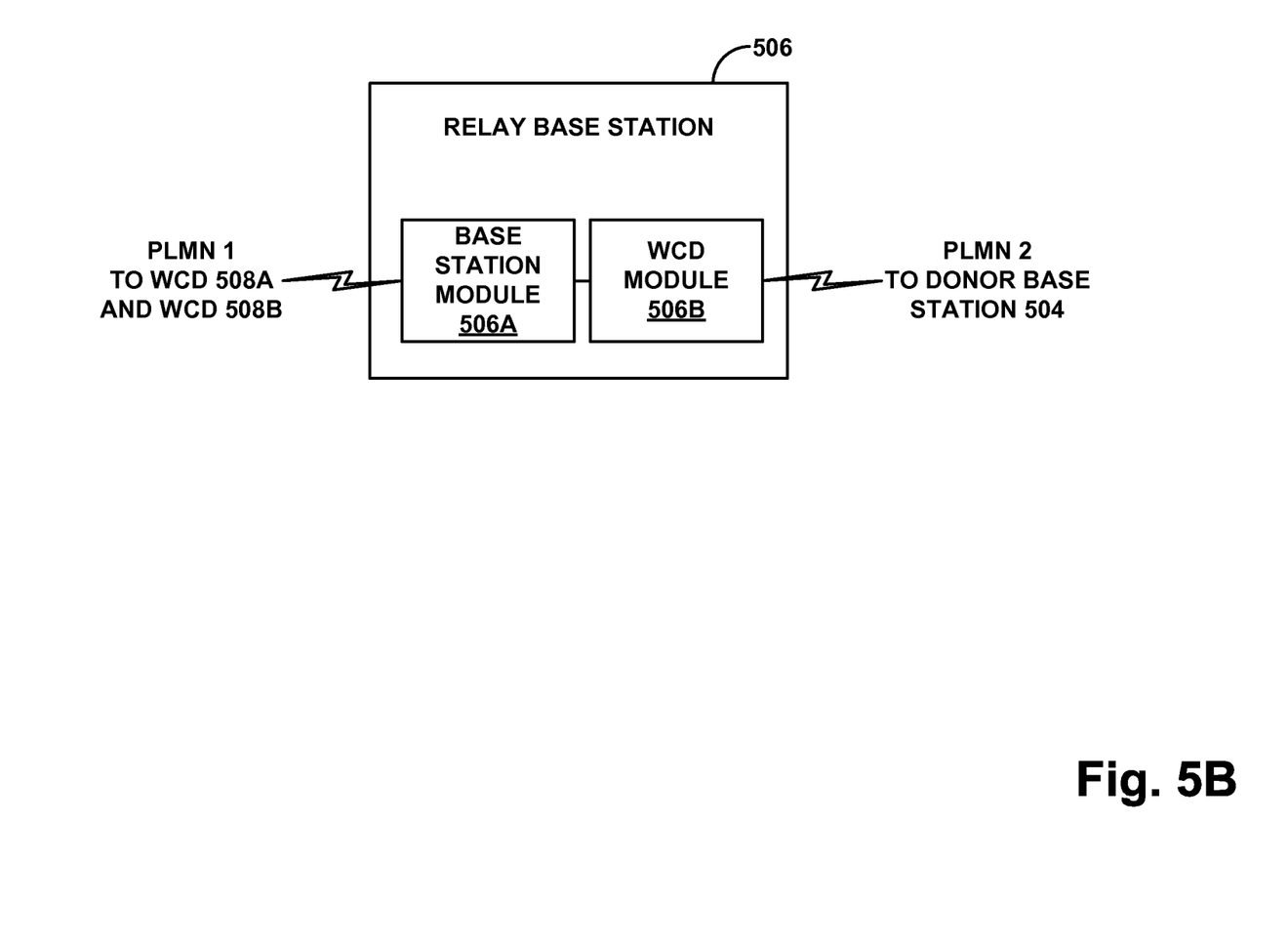
FIG. 5B is a block diagram of a relay base station, in accordance with an example embodiment.

In FIG. 5B, relay base station 506 is depicted in more detail. Particularly, relay base station 506 includes base station module 506A and WCD module 506B. This is just one example architecture of a relay base station. Other possibilities exist.

Base station module 506A may contain some or all base station functionality of a standard base station, such as base station 112. Thus, base station module 506A may define one or more wireless coverage areas with which to serve WCD 508A and WCD 508B. WCD module 506B may be or may imitate a WCD. Thus, relay base station 506 may use WCD module 506B to communicate with donor base station 504.

In some embodiments, base station module 506A and WCD module 506B may be hardware and software components integrated with one another in relay base station 506. In other embodiments, base station module 506A and WCD module 506B may be distinct hardware and software units linked to one another by a cable or bus. Other variations of relay base station 506 may exist.

As shown in FIG. 5B, it is possible for relay base station 506 to communicate on two different public land mobile networks, or PLMNs. A PLMN may define a network owned and/or operated by a wireless service provider. Particularly, a PLMN may be identified by a mobile country code (MCC) and a mobile network code (MNC). The MCC may define a particular country or region, while the MNC defines a particular network and/or a particular wireless service provider within that country. In some cases, the MCC also maps to a particular band of frequencies in which the PLMN operates. However, for the embodiments herein, more than one PLMN can be applied to the same frequencies in the same air interface. Particularly, some slots in an air interface can be associated with one PLMN, while other slots in the air interface may be associated with a different PLMN.

Regardless, FIG. 5B depicts relay base station 506 serving WCD 508A and WCD 508B by way of PLMN 1. FIG. 5B also depicts relay base station 506 communicating with donor base station 504 by way of PLMN 2. In some arrangements, donor base station may also communicate with WCD 502A, 502B, and 502C by way of PLMN 1 (not shown). In this manner, donor base station 504 can differentiate between traffic that is communicated to and from relay base stations and non-relay WCDs. Particularly, traffic to and from non-relay WCDs are communicated over a wireless air interface associated with PLMN 1, and traffic to and from relay base stations are communicated over a wireless air interface associated with PLMN2. PLMN 1 and PLMN 2 may be assigned in this fashion so that traffic to and from relay base stations can assigned to slots not subject to HARQ acknowledgment bundling (e.g., slot 408 in FIG. 4), while traffic to and from non-relay WCDs may be assigned to slots subject to HARQ acknowledgment bundling (e.g., slots 400 and 402 in FIG. 4).

In addition to PLMN codes being used to differentiate between traffic that a donor base station sends and receives from relay base stations and non-relay WCDs, quality of service class indicators (QCIs) can be used for this purpose as well.

In some embodiments, there may be multiple categories of priority and latency sensitivity between interactive multimedia traffic and best-effort traffic. As an example, in LTE, several levels of quality of service may be defined. Interactive voice, gaming, and video applications, as well as video streaming applications may be assigned various extents of air interface characteristics to support these requirements. For instance, these applications may be granted guaranteed bit rate (GBR), high priority, low latency, and/or low packet loss services over the air interface. On the other hand, multimedia signaling, best-effort services, and some less stringent types of interactive multimedia may be granted other types of services over the air interface.

TABLE 1

Quality of service levels for LTE.

| QCI | Bearer Type | Priority | Packet Delay | Packet Loss | Example |
|---|---|---|---|---|---|
| 1 | GBR | 2 | 100 milliseconds | $10^{-2}$ | Interactive voice |
| 2 | | 4 | 150 milliseconds | $10^{-3}$ | Interactive video |
| 3 | | 3 | 50 milliseconds | | Real time gaming |
| 4 | | 5 | 300 milliseconds | $10^{-6}$ | Streaming video |
| 5 | Non-GBR | 1 | 100 milliseconds | | Multimedia signaling |
| 6 | | 7 | 100 milliseconds | | Streaming media |
| 7 | | 6 | 300 milliseconds | $10^{-3}$ | Best-effort |
| 8/9 | | 8/9 | | $10^{-6}$ | services and streaming video |

Table 1 provides example quality of service levels for LTE. Each service level is identified with a quality of service class identifier (QCI), a bearer type (GBR or non-GBR), a priority (a smaller number indicates a higher priority), a packet delay (the highest allowable packet delay for the traffic), and a packet loss (the maximum acceptable packet loss rate). Generally, the lower the requested packet delay for a particular type of traffic, the higher its latency sensitivity. A RAN and the WCDs served by the RAN may identify quality of service levels to one another by using the appropriate QCI value.

For instance, donor base station 504 may assign QCI 6 for all traffic between donor base station 504 and relay base station 506. This effectively differentiates donor base stations from non-relay WCDs, as the latter are typically assigned to QCI 8 or 9. In this manner, donor base station 504 can assign some or all traffic to and from relay base stations to slots not subject to HARQ acknowledgment bundling (e.g., slot 408 in FIG. 4), while traffic to and from non-relay WCDs is typically assigned to slots subject to HARQ acknowledgment bundling (e.g., slots 400 and 402 in FIG. 4). Regardless, Table 1 is just one possible example of a mapping between QCI values and transmission rates. Other mappings are possible that use different QCI values.

In addition to or instead of using PLMN codes and/or QCI values to distinguish between non-relay WCDs and relay base stations, profile information associated with these devices that is stored in an HSS or SPS may be used. For instance, profile information for relay base stations may include an attribute indicating that the associated device is a relay base station. Lack of this attribute in the profile information may indicate that the associated device is a non-relay WCD.

Figure 5C:
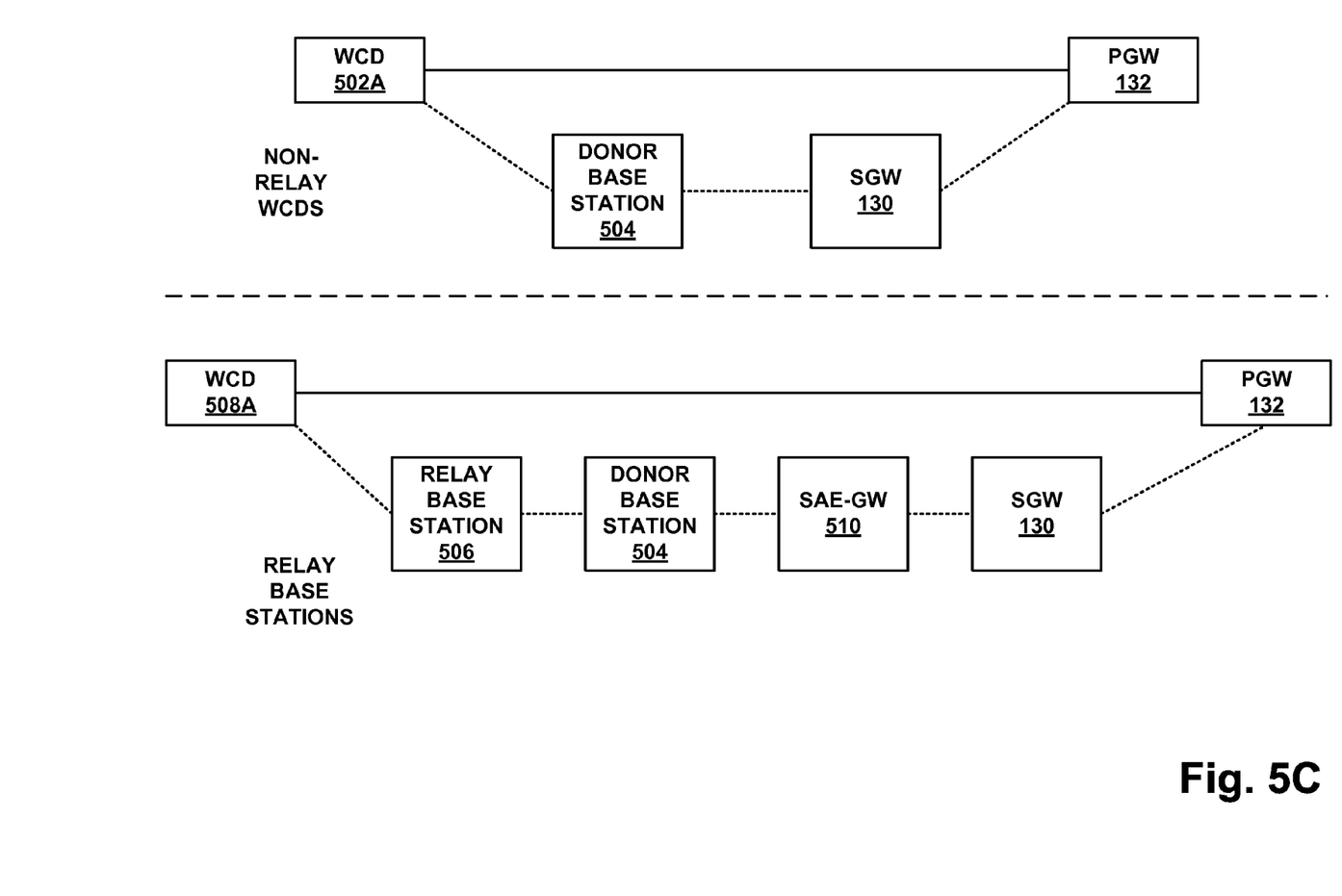
FIG. 5C depicts logical communication flows for non-relay WCDs and relay base stations, in accordance with an example embodiment.

FIG. 5C depicts logical communication flows for non-relay WCDs and relay base stations. Non-relay WCDs, such as WCD 502A, may communicate over a wireless air interface with donor base station 504 (in this case donor base station 504 is not acting as a "donor" with respect to WCD 502A, but is referred to as a donor for sake of consistency). Donor base station 504 communicates with SGW 130, and SGW 130 communicates with PGW 132. Via this path, a logical connection at the IP layer may be established between WCD 502A and PGW 132 for passage of bearer traffic between these devices. For instance, PGW 132 may assign an IP address and associated parameters to WCD 502A, so that WCD 502A can communicate with other WCDs and server devices, access the Internet, and so on.

The traffic of WCDs served by relay base stations, such as WCD 508A, may take a different route. WCD 502A may communicate over a wireless air interface with relay base station 506. Relay base station 506 may communicate over another wireless air interface with donor base station 504. Donor base station 504 may, in turn, communicate with SAE-GW 510, which communicates with SGW 130. SAE-GW 510 may assign an IP address and associated parameters to relay base station 506. Relay base station 506 may use this address to communicate with other devices in the RAN.

SGW 130 may communicate with PGW 132. Via this path, a logical connection at the IP layer may be established between WCD 508A and PGW 132 for passage of bearer traffic between these devices. For instance, PGW 132 may assign an IP address and associated parameters to WCD 508A, so that WCD 508A can communicate with other WCDs and server devices, access the Internet, and so on.

Despite FIG. 5C depicting these logical paths, other logical paths for carrying traffic between WCDs and PGW 132 may be used. Thus, the depiction of FIG. 5C is an example embodiment, and should be considered non-limiting.

While the embodiments herein generally discuss how to assign traffic to and from relay base stations to slots without HARQ acknowledgment bundling, in some cases it may be beneficial to do the opposite. For instance, if donor base station 504 receives a large amount of traffic to transmit to relay base station 506, donor base station 504 may queue this traffic for transmission. If the queue length reaches a high threshold value (e.g., a certain number of packets or subpackets queued, or a certain queue length in bytes), donor base station 504 may begin assigning this traffic to both slots with and without HARQ acknowledgment bundling. In this way, the queue may drain faster than it otherwise would because traffic transmitted to relay base station 506 can be assigned to more slots. Once the queue has drained below a low threshold value, donor base station 504 may once again assign the traffic only to slots not subject to HARQ acknowledgment bundling.

5. EXAMPLE OPERATIONS

Figure 6:
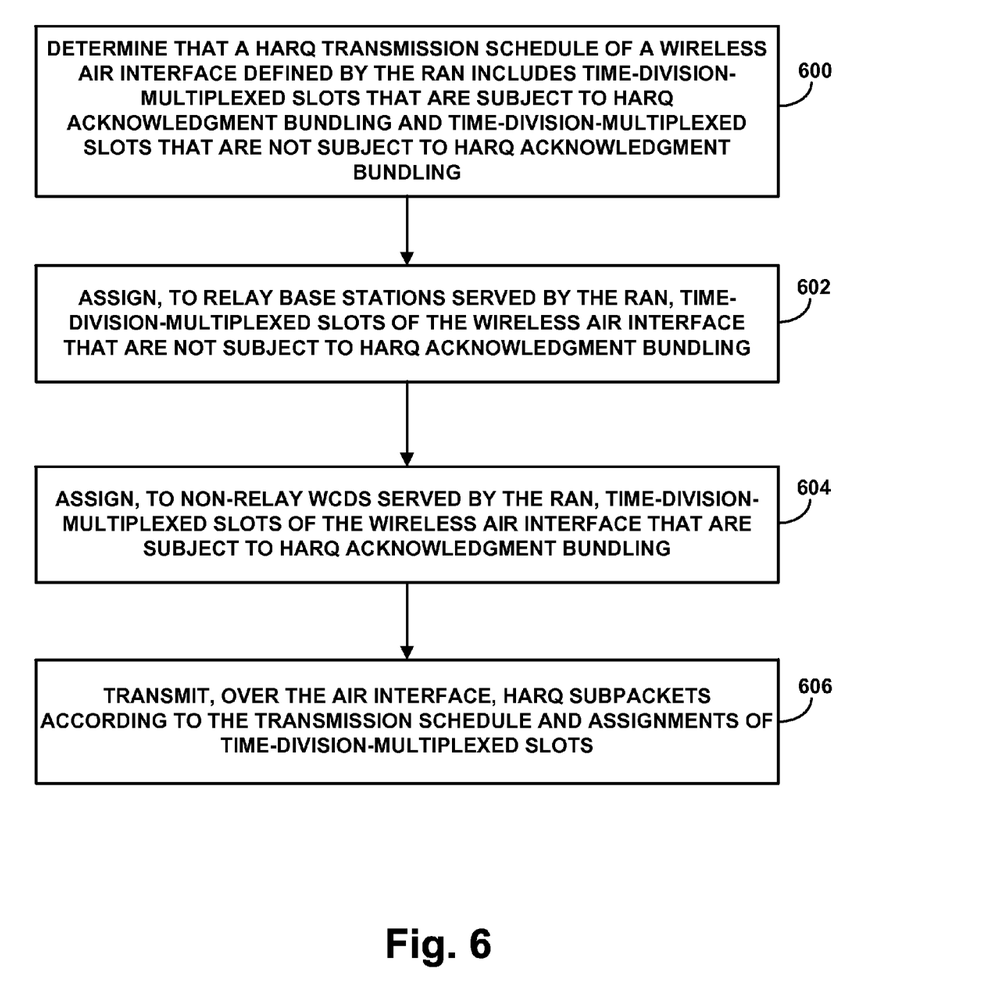
FIG. 6 is a flow chart, in accordance with an example embodiment.

FIG. 6 is a flow chart in accordance with an example embodiment. The operations illustrated by this flow chart may be carried out by a computing device, such as computing device 200. In some embodiments, computing device 200 may represent a RAN device, such as a base station. The RAN may communicate with relay base stations and non-relay WCDs using a TDD wireless channel in which the forward-direction traffic is separated from reverse-direction traffic by allocation of different respective time slots in a particular frequency band. However, the embodiments herein may be used with other types of wireless channels as well.

Block 600 of FIG. 6 may involve determining that a HARQ transmission schedule of a wireless air interface defined by the RAN includes time-division-multiplexed slots that are subject to HARQ acknowledgment bundling and time-division-multiplexed slots that are not subject to HARQ acknowledgment bundling. Block 602 may involve assigning, to relay base stations served by the RAN, time-division-multiplexed slots of the wireless air interface that are not subject to HARQ acknowledgment bundling. Block 604 may involve assigning, to non-relay WCDs served by the RAN, time-division-multiplexed slots of the wireless air interface that are subject to HARQ acknowledgment bundling. Block 606 may involve transmitting, over the air interface, HARQ subpackets according to the transmission schedule and assignments of time-division-multiplexed slots.

The RAN may communicate, by way of the wireless air interface, (i) with relay base stations using a first public land mobile network (PLMN) code, and (ii) with non-relay WCDs using a second PLMN code. Assigning time-division-multiplexed slots to relay base stations may be based on the first PLMN code, and assigning time-division-multiplexed slots to non-relay WCDs may be based on the second PLMN code.

Alternatively or additionally, (i) bearer traffic transmitted by the RAN to the relay base stations may be subject to a first QCI, and (ii) bearer traffic transmitted by the RAN to the non-relay WCDs may be subject to a second QCI. Assigning time-division-multiplexed slots to relay base stations may be based on the first QCI, and assigning time-division-multiplexed slots to non-relay WCDs may be based on the second QCI.

In some embodiments, the HARQ transmission schedule including HARQ acknowledgment bundling involves, possibly in response to a plurality of HARQ subpackets that the RAN transmits to a recipient, the RAN receiving a single HARQ acknowledgment message from the recipient, and wherein the recipient is a non-relay WCD. The single HARQ acknowledgment message may be a positive acknowledgment message that indicates that each of the plurality of HARQ subpackets was successfully received by the recipient. On the other hand, the single HARQ acknowledgment message may be a negative acknowledgment message that indicates that at least one of the plurality of HARQ subpackets was not successfully received by the recipient.

Further operations not explicitly shown in FIG. 6 may involve determining that the wireless air interface is subject to at least a threshold amount of congestion, and possibly in response to this determination, assigning, to the relay base stations served by the RAN, further time-division-multiplexed slots of the wireless air interface that are subject to HARQ acknowledgment bundling. Determining that the wireless air interface is subject to at least the threshold amount of congestion may involve determining that a queue associated with forward-direction traffic waiting for transmission to the relay base stations has at least a threshold occupancy.

6. CONCLUSION

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims.

The above detailed description describes various features and functions of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are contemplated herein.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, functions described as steps, blocks, transmissions, communications, requests, responses, and/or messages can be executed out of order from that shown or discussed, including substantially concurrent or in reverse order, depending on the functionality involved. Further, more or fewer blocks and/or functions can be used with any of the ladder diagrams, scenarios, and flow charts discussed herein, and these ladder diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments can include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A method comprising:
   determining that a hybrid automatic repeat request (HARQ) transmission schedule of a wireless air interface defined by a radio access network (RAN) includes time-division-multiplexed slots that are subject to HARQ acknowledgment bundling and time-division-multiplexed slots that are not subject to HARQ acknowledgment bundling;

assigning, to relay base stations served by the RAN, time-division-multiplexed slots of the wireless air interface that are not subject to HARQ acknowledgment bundling;

assigning, to non-relay wireless communication devices (WCDs) served by the RAN, time-division-multiplexed slots of the wireless air interface that are subject to HARQ acknowledgment bundling; and transmitting, over the air interface, HARQ subpackets according to the transmission schedule and assignments of time-division-multiplexed slots, wherein the RAN communicates, by way of the wireless air interface, (i) with the relay base stations using a first public land mobile network (PLMN) code, and (ii) with the non-relay WCDs using a second PLMN code, and wherein assigning the time-division-multiplexed slots that are not subject to HARQ acknowledgment bundling to the relay base stations is based on the first PLMN code, and assigning time-division-multiplexed slots that are subject to HARQ acknowledgment bundling to the non-relay WCDs is based on the second PLMN code.

2. The method of claim 1, wherein (i) bearer traffic transmitted by the RAN to the relay base stations is subject to a first QOS class identifier (QCI), and (ii) bearer traffic transmitted by the RAN to the non-relay WCDs is subject to a second QCI, and wherein assigning time-division-multiplexed slots to relay base stations is based on the first QCI, and assigning time-division-multiplexed slots to non-relay WCDs is based on the second QCI.

3. The method of claim 1, wherein the HARQ transmission schedule including HARQ acknowledgment bundling comprises, in response to a plurality of HARQ subpackets that the RAN transmits to a recipient, the RAN receiving a single HARQ acknowledgment message from the recipient, and wherein the recipient is a non-relay WCD.

4. The method of claim 3, wherein the single HARQ acknowledgment message is a positive acknowledgment message that indicates that each of the plurality of HARQ subpackets was successfully received by the recipient.

5. The method of claim 3, wherein the single HARQ acknowledgment message is a negative acknowledgment message that indicates that at least one of the plurality of HARQ subpackets was not successfully received by the recipient.

6. The method of claim 1, wherein the RAN communicates over the wireless air interface using a time division duplex (TDD) wireless channel in which the forward-direction traffic is separated from reverse-direction traffic by allocation of different respective time slots in a particular frequency band.

7. The method of claim 1, further comprising:
determining that the wireless air interface is subject to at least a threshold amount of congestion; and
in response to determining that the wireless air interface is subject to at least the threshold amount of congestion, assigning, to the relay base stations served by the RAN, further time-division-multiplexed slots of the wireless air interface that are subject to HARQ acknowledgment bundling.

8. The method of claim 7, wherein determining that the wireless air interface is subject to at least the threshold amount of congestion comprises determining that a queue associated with forward-direction traffic waiting for transmission to the relay base stations has at least a threshold occupancy.

9. An article of manufacture including a non-transitory computer-readable medium, having stored thereon program instructions that, upon execution by a radio access network (RAN) device, cause the RAN device to perform operations comprising:

determining that a hybrid automatic repeat request (HARQ) transmission schedule of a wireless air interface defined by the RAN includes time-division-multiplexed slots that are subject to HARQ acknowledgment bundling and time-division-multiplexed slots that are not subject to HARQ acknowledgment bundling;

assigning, to relay base stations served by the RAN, time-division-multiplexed slots of the wireless air interface that are not subject to HARQ acknowledgment bundling;

assigning, to non-relay wireless communication devices (WCDs) served by the RAN, time-division-multiplexed slots of the wireless air interface that are subject to HARQ acknowledgment bundling; and transmitting, over the air interface, HARQ subpackets according to the transmission schedule and assignments of time-division-multiplexed slots, wherein the RAN communicates, by way of the wireless air interface, (i) with the relay base stations using a first public land mobile network (PLMN) code, and (ii) with the non-relay WCDs using a second PLMN code, and wherein assigning the time-division-multiplexed slots that are not subject to HARQ acknowledgment bundling to the relay base stations is based on the first PLMN code, and assigning time-division-multiplexed slots that are subject to HARQ acknowledgment bundling to the non-relay WCDs is based on the second PLMN code.

10. The article of manufacture of claim 9, wherein (i) bearer traffic transmitted by the RAN to the relay base stations is subject to a first QOS class identifier (QCI), and (ii) bearer traffic transmitted by the RAN to the non-relay WCDs is subject to a second QCI, and wherein assigning time-division-multiplexed slots to relay base stations is based on the first QCI, and assigning time-division-multiplexed slots to non-relay WCDs is based on the second QCI.

11. The article of manufacture of claim 9, wherein the HARQ transmission schedule including HARQ acknowledgment bundling comprises, in response to a plurality of HARQ subpackets that the RAN transmits to a recipient, the RAN receiving a single HARQ acknowledgment message from the recipient, and wherein the recipient is a non-relay WCD.

12. The article of manufacture of claim 11, wherein the single HARQ acknowledgment message is a positive acknowledgment message that indicates that each of the plurality of HARQ subpackets was successfully received by the recipient.

13. The article of manufacture of claim 11, wherein the single HARQ acknowledgment message is a negative acknowledgment message that indicates that at least one of the plurality of HARQ subpackets was not successfully received by the recipient.

14. The article of manufacture of claim 9, wherein the RAN communicates over the wireless air interface using a time division duplex (TDD) wireless channel in which the forward-direction traffic is separated from reverse-direction traffic by allocation of different respective time slots in a particular frequency band.

15. The article of manufacture of claim 9, wherein the operations further comprise:
   determining that the wireless air interface is subject to at least a threshold amount of congestion; and
   in response to determining that the wireless air interface is subject to at least the threshold amount of congestion, assigning, to the relay base stations served by the RAN, further time-division-multiplexed slots of the wireless air interface that are subject to HARQ acknowledgment bundling.

16. The article of manufacture of claim 15, wherein determining that the wireless air interface is subject to at least the threshold amount of congestion comprises determining that a queue associated with forward-direction traffic waiting for transmission to the relay base stations has at least a threshold occupancy.

17. A radio access network (RAN) device comprising:
   at least one processor;
   data storage; and
   program instructions, stored in the data storage, that upon execution by the at least one processor cause the RAN device to perform operations including:
   determining that a hybrid automatic repeat request (HARQ) transmission schedule of a wireless air interface defined by the RAN includes time-division-multiplexed slots that are subject to HARQ acknowledgment bundling and time-division-multiplexed slots that are not subject to HARQ acknowledgment bundling;
   assigning, to relay base stations served by the RAN, time-division-multiplexed slots of the wireless air interface that are not subject to HARQ acknowledgment bundling;
   assigning, to non-relay wireless communication devices (WCDs) served by the RAN, time-division-multiplexed slots of the wireless air interface that are subject to HARQ acknowledgment bundling; and
   transmitting, over the air interface, HARQ subpackets according to the transmission schedule and assignments of time-division-multiplexed slots, wherein the RAN communicates, by way of the wireless air interface, (i) with the relay base stations using a first public land mobile network (PLMN) code, and (ii) with the non-relay WCDs using a second PLMN code, and wherein assigning the time-division-multiplexed slots that are not subject to HARQ acknowledgment bundling to the relay base stations is based on the first PLMN code, and assigning time-division-multiplexed slots that are subject to HARQ acknowledgment bundling to the non-relay WCDs is based on the second PLMN code.

18. The RAN device of claim 17, wherein the operations further include:
   determining that the wireless air interface is subject to at least a threshold amount of congestion; and
   in response to determining that the wireless air interface is subject to at least the threshold amount of congestion, assigning, to the relay base stations served by the RAN, further time-division-multiplexed slots of the wireless air interface that are subject to HARQ acknowledgment bundling.

19. The RAN device of claim 17, wherein (i) bearer traffic transmitted by the RAN to the relay base stations is subject to a first QOS class identifier (QCI), and (ii) bearer traffic transmitted by the RAN to the non-relay WCDs is subject to a second QCI, and wherein assigning time-division-multiplexed slots to relay base stations is based on the first QCI, and assigning time-division-multiplexed slots to non-relay WCDs is based on the second QCI.

20. The RAN device of claim 17, wherein the HARQ transmission schedule including HARQ acknowledgment bundling comprises, in response to a plurality of HARQ subpackets that the RAN transmits to a recipient, the RAN receiving a single HARQ acknowledgment message from the recipient, and wherein the recipient is a non-relay WCD.

* * * * *